July 12, 1927.
W. G. COLES
1,635,540
LUBRICATOR
Filed April 19, 1924   2 Sheets-Sheet 1
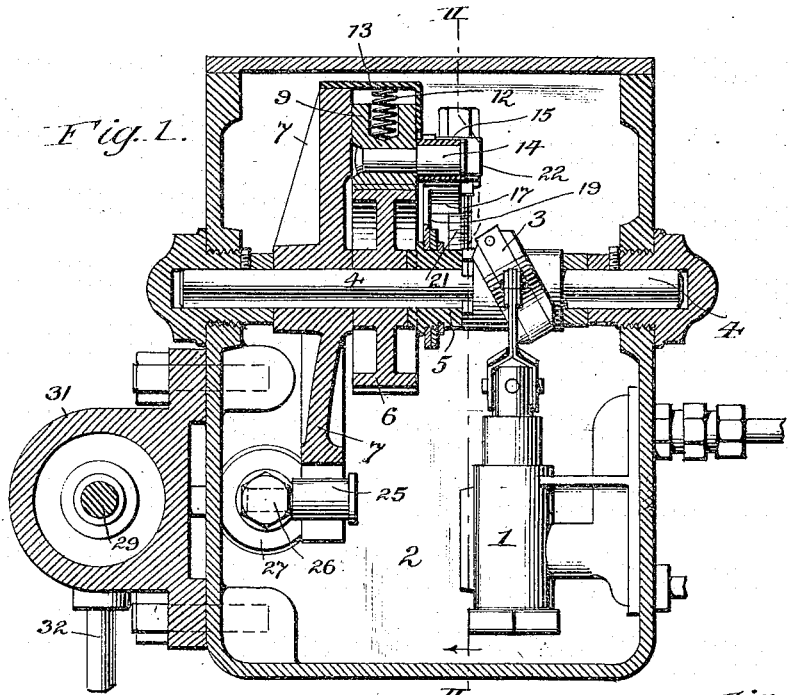
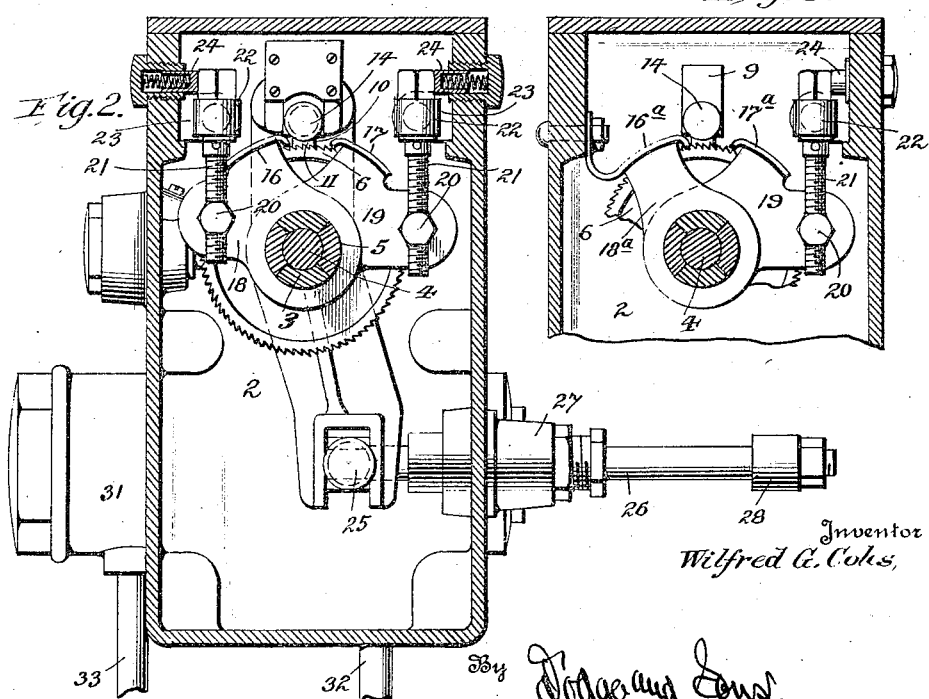
Inventor
Wilfred G. Coles,

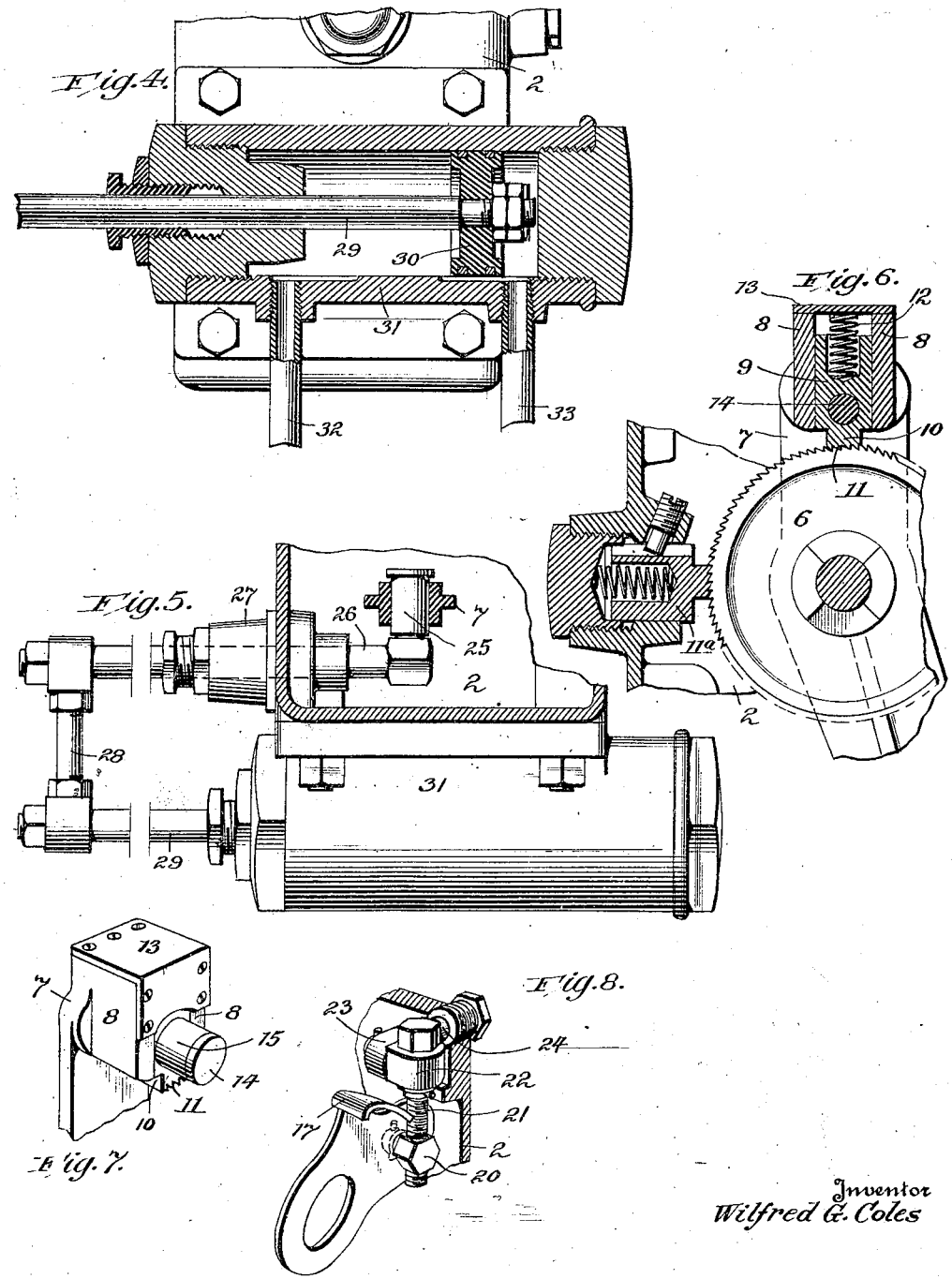

Patented July 12, 1927.

1,635,540

UNITED STATES PATENT OFFICE.

WILFRED GEORGE COLES, OF MADISON, WISCONSIN, ASSIGNOR TO MADISON KIPP CORPORATION, OF MADISON, WISCONSIN, A CORPORATION OF WISCONSIN.

LUBRICATOR.

Application filed April 19, 1924. Serial No. 707,780.

This invention pertains to lubricators and more particularly to lubricators employed upon locomotives.

The main object of the invention is to provide a driving mechanism, operated through a fluid medium, which is responsive to the demands of the locomotive needs; that is to say, a mechanism which will actuate the lubricator in consonance with the frequency of operation of the part to be lubricated and thus at all times ensure the delivery of the proper and requisite amount of lubricant. Thus, over or under lubrication is prevented.

The invention has for its further object the provision of means whereby the amount of lubricant delivered at each impulse or stroke of the lubricant delivering or forcing mechanism will remain constant, irrespective of the pressure of the fluid pressure medium employed to actuate the operating mechanism.

As a result of employing fluid actuated driving mechanism for the lubricator, I am enabled to place the lubricator at any desired point on the locomotive and am not constrained to the positioning thereof adjacent to the part to be lubricated or adjacent to a mechanically moving element from which it derives its power.

With these and other objects and advantages in view, reference is had to the annexed drawings wherein:

Fig. 1 is a vertical sectional view of a lubricator illustrative of my invention;

Fig. 2 is a transverse sectional view on the line II—II of Fig. 1;

Fig. 3 is a detail sectional view illustrating a modified arrangement of the pawl lifter employed to impart movement to the lubricant forcing device.

Fig. 4 is a vertical longitudinal sectional view through the fluid motor employed to actuate the lubricator or, more specifically, the pawl carrier;

Fig. 5 is a horizontal section illustrating the connection between the piston rod and the pawl carrier;

Fig. 6 is a detail view of the ratchet wheel, through which motion is imparted to the lubricator unit, and the actuating and holding pawls;

Fig. 7 is a perspective view of the actuating pawl carrier, and

Fig. 8 is a like view of one of the adjustable pawl lifters.

The lubricant forcing mechanism may be of any approved type, as for instance such as shown in Patents Nos. 1,262,979 and 1,066,238.

In Fig. 1 a pump element 1 adapted to force the lubricant to the desired point is shown as mounted in an oil reservoir 2, and adapted to be actuated by a wobbling eccentric 3 mounted for rotation upon a shaft 4.

The eccentric has an interlocking engagement with a sleeve 5 which in turn has a similar engagement with a ratchet wheel 6, said elements being mounted for revolution on the shaft.

An actuating or pawl carrying lever 7 stands next adjacent the ratchet wheel, the upper end thereof being provided with an inwardly extending guide or guideway 8, see Figs. 6 and 7, in which is mounted a block 9 the lower end thereof is provided with a projection 10 having ratchet teeth 11 formed thereon adapted to engage the teeth of the ratchet wheel 6. The block, which in effect is a pawl, is urged toward the wheel by a spring 12 seated in a recess in the block and bearing at its upper end against a cover plate 13 secured to the lever 7.

Extending outwardly from the lower portion of the block is a headed stud 14 upon which is mounted a roller 15. Said roller stands in the path of two lifter plates 16 and 17 formed respectively upon the upper portions of two arms 18 and 19 which are journaled upon the sleeve 5.

The arms, and consequently the lifter plates, are adjustable toward and from each other. To effect such adjustment, each arm is provided with a stud as 20, which extends freely therethrough, see Fig. 8, the head whereof is provided with a threaded opening extending transversely thereof. A screw 21 having a polygonal head, engages said opening, the screw being mounted for rotation in a block 22 journaled in a fixed lug 23 formed on the inner wall of the reservoir or casing 2.

A spring-pressed plunger 24 engages the head of screw 21 and locks the same in place.

As will be understood by turning the screws 21, the arms 18 and 19 may be swung about the collar 5 and the lifter plates 16 and 17 brought close together or spread apart and, as a consequence the time of engagement, and likewise the period of engagement, of the ratchet with the ratchet wheel 6 is regulated and determined. When lever 7 is moved to its extreme counterclockwise position roller 15 rests upon plate 16 and the pawl is elevated and withdrawn from engagement with the wheel. When the lever is moved in the reverse direction roller 15 moves along plate 16 and off the end thereof allowing the pawl to move inwardly and engage the ratchet wheel thereby causing the wheel to move forwardly and to actuate the oil pump 1. Such engagement continues until the roller contacts plate 17,—the plate acting to lift the pawl and disengage it from the ratchet wheel.

It is evident that both plates need not be adjustable. Thus in Fig. 3 the plate 16ª and its supporting arm 18ª are shown as fixed, the adjustment being effected alone through the other plate 17ª.

A spring-pressed pawl 11ª, Fig. 6, will be employed to prevent retrograde movement of ratchet wheel 6.

The lower end of lever 7 is bifurcated and a pin or stud 25 extends within the same, the stud being connected to the inner end of a rod 26, see Fig. 5, mounted for reciprocation in a stuffing box 27.

The outer end of the rod is connected by a cross bar on head 28 to a piston rod 29, the latter being attached to a piston 30 mounted for reciprocation in a cylinder 31. Said cylinder may be secured to the locomotive at any desired point or place and steam pipes 32 and 33, extend from opposite ends of the cylinder to the corresponding ends of the engine cylinder so that steam is admitted to and exhausted from the cylinder 31 in unison with the admission and exhaust from the locomotive cylinder. Cylinder and piston 31 and 30 may be termed an auxiliary engine, which, by reason of the manner in which it is connected up to the steam supply and exhaust of the locomotive works in consonance with the piston thereof consequently causing the lubricator to supply oil in the requisite quantity and at the necessary periods.

It is important that the pawl be lifted before the piston 30 reaches the end of its stroke in either direction, this with a view of keeping the effective stroke or movement of the pawl constant. The piston will of course be cushioned at each end of its stroke—as by the usual practice of trapping a portion of the steam, or by interposing spring cushions or takeups. When steam at high pressure is being utilized, piston 30 will travel further than when low pressure steam is employed, consequently were it not for the presence of the lifters which disengage the pawl prior to the completion of the stroke of the piston, there would be a greater travel of the ratchet wheel 6 when operating with high pressure steam than when operating with low pressure, with a relatively larger feed of oil.

The arrangement above specified, however, ensures a given quantity of oil being fed irrespective of the steam pressure and the travel of the piston due to the constant effective movement of the pawl.

With the use of the pawl lifters, as above described, the amount of oil which is fed is of course subject to regulation. When however a lubricator is designed to deliver a fixed amount of oil both lifters may be made rigid.

Under all the constructions it will of course be appreciated that the effective stroke is regulated and determined by the distance between the adjacent ends of the lifters and therefore any wear or lost motion that takes place in the driving mechanism does not lessen the amount of oil which is forced by the lubricator.

While I have described the invention as applied to steam engines, it is to be understood that it is of more general application. It may be utilized in the lubrication of an air compressor, employing air to actuate the lubricator motor; so, to, in a steam pump which pumps water, or any other fluid, the fluid itself may be used to actuate the piston 30.

It is also manifest that various means, other than the specific one illustrated, may be employed to impart movement from the piston to the pawl-carrying lever;—as they are obvious it is not deemed necessary to describe the same.

It is also to be understood that the motor described is merely typical; other types may be employed.

What is claimed is:

1. In a force feed lubricator the combination of a motor; means for feeding fluid pressure thereto from the machine to be lubricated to actuate the same; an oil pump; a ratchet wheel in operative relation therewith; an oscillating lever actuated by the motor; a spring pressed pawl carried by the lever and normally engaging the ratchet wheel to drive the same in one direction; lifters adapted to move the pawl out of engagement at both ends of the stroke; and means for adjusting at least one of the lifters with reference to the wheel.

2. In a force feed lubricator the combination of a motor; means for feeding fluid pressure thereto from the machine to be lubricated to actuate the same; an oil pump; a ratchet wheel in operative relation therewith; an oscillating lever actuated by the motor; a spring pressed pawl carried by the lever and normally engaging the ratchet wheel to drive the same in one direction; a pair of lifters arranged adjacent said ratchet wheel adapted to move the pawl out of engagement with the ratchet wheel as the lever is swung back and forth; and means for securing adjustment of at least one of said lifters toward and from the other.

In testimony whereof I have signed my name to this specification.

WILFRED GEORGE COLES.